(12) United States Patent
Maurya et al.

(10) Patent No.: US 10,148,651 B2
(45) Date of Patent: Dec. 4, 2018

(54) AUTHENTICATION SYSTEM

(71) Applicant: BlackBerry Limited, Waterloo (CA)

(72) Inventors: Sanjiv Maurya, Fremont, CA (US);
Luis Chirinos, Santa Clara, CA (US);
Bobby Abraham, Cupertino, CA (US);
Simon Brooks, Sunnyvale, CA (US)

(73) Assignee: BlackBerry Limited, Waterloo, Ontario (CA)

(*) Notice: Subject to any disclaimer, the term of this patent is extended or adjusted under 35 U.S.C. 154(b) by 111 days.

(21) Appl. No.: 15/036,998

(22) PCT Filed: Nov. 17, 2014

(86) PCT No.: PCT/US2014/065977
§ 371 (c)(1),
(2) Date: May 16, 2016

(87) PCT Pub. No.: WO2015/073979
PCT Pub. Date: May 21, 2015

(65) Prior Publication Data
US 2016/0277400 A1   Sep. 22, 2016

Related U.S. Application Data

(60) Provisional application No. 61/905,127, filed on Nov. 15, 2013.

(51) Int. Cl.
*H04L 29/06* (2006.01)
(52) U.S. Cl.
CPC ...... *H04L 63/0876* (2013.01); *H04L 63/0807* (2013.01); *H04L 63/18* (2013.01)
(58) Field of Classification Search
CPC .................................................. H04L 63/0876
See application file for complete search history.

(56) References Cited

U.S. PATENT DOCUMENTS 7,770,206 B2 * 8/2010 Dillaway ............... G06F 21/33
726/2
8,091,120 B2 * 1/2012 Perrella ............... H04L 63/0823
709/227
(Continued)

FOREIGN PATENT DOCUMENTS

| CA | 2571255 | 6/2007 | |
| WO | WO 9617476 A1 * | 6/1996 | ......... H04N 7/17318 |
| WO | WO 2007071009 A1 * | 6/2007 | ............. H04L 63/06 |

OTHER PUBLICATIONS

International Search Report and Written Opinion of the International Searching Authority issued In International Application No. PCT/US2014/065977 dated Mar. 16, 2015; 11 pages.
(Continued)

*Primary Examiner* — Shawnchoy Rahman
(74) *Attorney, Agent, or Firm* — Fish & Richardson P.C.

(57) ABSTRACT

Embodiments provide methods, devices and computer program arranged to facilitate authenticated communication between a user device and a service associated with a network. One embodiment comprises an apparatus which, in response to authenticating a user device on the basis of a first authentication protocol, transmits a request for a credential of a first type to an authentication server associated with the network via a communications link therebetween, the credential of the first type being for use by the apparatus to obtain a credential of a second type on behalf of the user device from the authentication server. Subsequently, the apparatus transmits a request for a credential of a second type to the authentication server via the communications link therebetween, the credential of the second type being for use by the user device in establishing authenticated communication with the service. The credential of the second type is then transmitted to the user device.

20 Claims, 13 Drawing Sheets

(56) References Cited

U.S. PATENT DOCUMENTS

| | | | |
|---|---|---|---|
| 8,276,190 B1 | 9/2012 | Chang et al. | |
| 8,437,271 B2* | 5/2013 | Raleigh | G06Q 10/06375 |
| | | | 370/252 |
| 8,909,196 B2* | 12/2014 | Chang | H04W 12/06 |
| | | | 370/311 |
| 9,178,868 B1* | 11/2015 | Leung | H04L 67/02 |
| 2006/0015358 A1 | 1/2006 | Chua | |
| 2006/0048213 A1 | 3/2006 | Cheng et al. | |
| 2008/0046308 A1* | 2/2008 | Cook | G06F 21/121 |
| | | | 705/7.34 |

OTHER PUBLICATIONS

Welch Von, R.B. et al.; "A National-Scale Authentication Infrastructure"; IEEE Design & Test of Computers, vol. 33, No. 12; Dec. 1, 2000; pp. 60-66.

* cited by examiner

AUTHENTICATION SYSTEM

CROSS-REFERENCE TO RELATED APPLICATIONS

This application is a U.S. National Stage of PCT/US2014/065977, filed on Nov. 17, 2014, which claims priority to U.S. Provisional Application No. 61/905,127, filed on Nov. 15, 2013, the entire contents of which are hereby incorporated by reference.

BACKGROUND OF THE INVENTION

Technical Field of the Invention

Embodiments described herein relate to the field of network authentication for user devices and provides methods, systems and computer program products for facilitating authenticated communication with a service.

Description of the Related Technology

Access to services provided by a secure network is typically restricted to authorized users and/or user devices (or user terminals), which may include wireless transmit/receive units. In this regard, an authentication server associated with a secure network, or more specifically an authentication domain or realm, authenticates user devices on the basis of an authentication protocol, such as Kerberos authentication protocol developed by the Massachusetts Institute of Technology in the United States of America, and selectively authorizes these devices to access one or more services provided by the secure network. For example, in accordance with the Kerberos authentication protocol, upon receiving an authentication request from a user device, a Key Distribution Centre (KDC) component of the authentication server verifies whether the user device is authorized to access services provided by the network. If so, the KDC provisions an authentication credential, such as a Ticket Granting Ticket (TGT), for use in obtaining a service credential, such as a service ticket, from a Ticket Granting Service (TGS) component of the authentication server for use in accessing a service provided by the network.

Increasingly, user devices are able to access services from a plurality of domains, each of which independently authenticates user devices before allowing access to a service. Each of these domains is referred to herein as an "authentication domain." Typically, a user will connect to an authentication server in an authentication domain via their user device, whereupon the user is authenticated on the basis of an authentication protocol by the authentication server and thereafter selectively authorized to obtain a service credential for use in accessing a service provided by the corresponding domain. However, these mechanisms require users to separately authenticate in each authentication domain, and can be cumbersome for users.

To alleviate this problem, authentication protocols such as the Kerberos authentication protocol include a constrained delegation mechanism (so-called "Kerberos Constrained Delegation" (KCD)), in which a first authentication server of a first authentication domain, subsequent to authenticating the user device, is permitted to obtain a TGS from a second authentication server of a second authentication domain. This enables the first authentication server to obtain a service ticket corresponding to a service associated with the second domain on behalf of the user device. Specifically, the second authentication server provides a TGS to the first authentication server that allows it to obtain a service ticket on behalf of the user device for use in establishing authenticated communication between the user device and the service associated with the second authentication domain. Subsequent to obtaining the service ticket, the first authentication server transmits the service ticket to the user device, which then uses it to authenticate to the service and the service selectively permits the user device to communicate therewith.

One drawback of the KCD based cross-domain authentication mechanism is that it cannot be used to access services that are not configured to authenticate user devices on the basis of the KCD based cross-domain authentication mechanism.

SUMMARY

In accordance with aspects of the current disclosure, there is provided a method, a system and an apparatus for facilitating authenticated communication between a user device and a service associated with a network according to the appended claims.

In a first exemplary embodiment there is provided an apparatus for facilitating authenticated communication between a user device and a service associated with an authentication realm, the apparatus comprising a processor and at least one memory, wherein the processor and the at least one memory are arranged to cause the apparatus to at least: responsive to receiving an authentication request of a first type comprising data indicative of a user identity via a first communications link between the user device and the apparatus, selectively configure the apparatus such that the user device is authorized to communicate with the apparatus, wherein the authentication request of the first type is based on a first authentication protocol; thereafter: transmit a request for a credential of a first type via a second communications link between the apparatus and a server, wherein: the server is associated with the authentication realm and is arranged to authenticate the user device on the basis of a second authentication protocol, different to the first authentication protocol, and selectively allow the user device to communicate with the service in dependence on said authentication; said credential of the first type is for use by the apparatus in obtaining a credential of a second type on behalf of the user device from the server, said request for the credential of the first type comprising data indicative of the user identity and being based on the second authentication protocol; responsive to receiving the credential of the first type, transmit a request for the credential of the second type on behalf of the user device via said second communications link, said credential of the second type being for use by the user device in establishing authenticated communication with the service via a third communications link between the user device and the service, said request for the credential of the second type comprising data indicative of the user identity and being based on the second authentication protocol; and in response to receiving the credential of the second type, transmit the credential of the second type via the first communications link.

Subsequent to obtaining the credential of the second type, the apparatus transmits it to the user device. The user device may then construct an authentication message, such as a reply to an authentication challenge from the service, which is compatible with the service. Accordingly, the apparatus resolves incompatibilities between authentication mechanisms by causing the user device to generate an authentication message compatible with the service.

In one arrangement, the user device comprises one or more applications that have been authorized to access the service associated with network, and the apparatus may maintain a record comprising data indicative of the or each of the authorized applications. For example, the apparatus may provision an authentication token to each of the authorized applications. In this way a given authorized application can authenticate itself to the intermediary using its provisioned token, and thereby trigger a request for the credential of the second type in respect of the authorized application on behalf of the user. In addition the user device is configured so as to be authorized to generate a said request for the credential of the second type by a process whereby the user is authenticated by the user terminal.

In another arrangement, the credential of the second type may be encrypted on the basis of a key corresponding to the apparatus. In this case, the apparatus decrypts the credential of the first type and transmits the decrypted credential of the first type to the user device. The apparatus therefore advantageously eliminates the requirement for sharing its decryption key with the user device.

In another arrangement, the apparatus may transmit a portion of the credential of the second type which is required for generating the authentication message to the user device. Without limitation, such a portion may include one or more of a session key, a network address, the user identity and a validity time period associated with the credential of the second type. In this way, the apparatus removes redundant parts of the credential of the second type which are not required for preparing the authentication message, and consequently conserves processing resources of the user terminal which would otherwise had been expended.

The apparatus may selectively transmit requests for the credentials of the first and/or second types on the basis of a predetermined criterion, such as geographical location of the device. Thus, for example, the apparatus may enforce one or more policies, which may, for example, be specified by the network.

The credential of the first type may be associated with a predetermined validity period, which, for example, may have been specified by the server. In this case, the apparatus may monitor for expiry of the predetermined validity period and cause issuance of a further credential of the first type in response to expiry of the predetermined validity period. Thus, the apparatus may maintain its ability to obtain a further credential of the second type. The apparatus may cause such issuance in response to receiving a request for the further credential of the second type from the user device.

In another arrangement, the credential of the second type may be associated with a further predetermined validity period, which, for example, may have been specified by the server. In this case, the apparatus may monitor for expiry of the further predetermined validity period and cause issuance of a further credential of the first type in response to expiry of the further predetermined validity period. Thus, the apparatus enables the user device to maintain and refresh authenticated communication with the service. The apparatus may cause such issuance in response to receiving a request for the further credential of the second type from the user device.

In a second exemplary embodiment there is provided a method of facilitating authenticated communication between a user device and a service associated with a network via an intermediary, the method comprising causing the intermediary to: responsive to receiving an authentication request comprising data indicative of a user identity via a first communications link between the user device and the intermediary, selectively configure the intermediary such that the user device is authorized to communicate with the intermediary, wherein the authentication request is based on a first authentication protocol; thereafter: transmit a request for a credential of a first type via a second communications link between the intermediary and a server, wherein: the server is associated with the network and is arranged to authenticate the user device on the basis of a second authentication protocol, different to the first authentication protocol, and selectively allow the user device to communicate with the service in dependence on said authentication; said credential of the first type is for use by the intermediary in obtaining a credential of a second type on behalf of the user device from the server, said request for the credential of the first type comprising data indicative of the user identity and being based on the second authentication protocol; responsive to receiving the credential of the first type, transmit a request for the credential of the second type on behalf of the user device via said second communications link, said credential of the second type being for use by the user device in establishing authenticated communication with the service via a third communications link between the user device and the service, said request for the credential of the second type comprising data indicative of the user identity and being based on the second authentication protocol; and in response to receiving the credential of the second type, transmit the credential of the second type via the first communications link.

The first and second exemplary embodiments are most conveniently implemented in an authentication server. Embodiments also include a computer program comprising a set of instructions, which, when executed by an authentication server, cause the authentication server to perform a method according to the second embodiment.

In a third exemplary embodiment there is provided a user terminal configured to establish an authenticated communication with a service associated with a network via an intermediary, the user terminal comprising a processor and at least one memory, wherein the processor and the at least one memory are arranged to cause the user terminal to at least: transmit an authentication request of a first type comprising data indicative of a user identity via a first communications link between the user terminal and the intermediary, the authentication request of the first type being based on a first authentication protocol for use in enabling authenticated communication with the user terminal; thereafter transmit a request for a credential of a second type via the first communications link, said credential of the second type being for use in enabling authenticated communication with the service via a second authentication protocol, different to said first authentication protocol, wherein the intermediary is configured to obtain said credential of the second type on the basis of a credential of a first type, said credential of the first type being for use by the intermediary in obtaining said credential of the second type on behalf of the user terminal from a server associated with the network; and in response to receiving the credential of the second type, transmitting the credential of the second type via a further communications link, different from said first communication link and configured between the user terminal and the service, whereby to establish authenticated communication with the service.

In one arrangement, the user terminal comprises one or more applications that are authorized to access the service associated with network, for example on the basis of authentication tokens provisioned by the intermediary. The authorized application can then authenticate itself to the intermediary using its provisioned token, and thereby trigger a request for the credential of the second type in respect of the authorized application on behalf of the user.

In a fourth exemplary embodiment there is provided a system for facilitating authenticated communication between a user device and a service associated with an authentication realm, the system comprising a first apparatus and a second apparatus, wherein: the first apparatus comprises a first processor and at least one first memory, wherein the first processor and the at least one first memory are configured to cause the apparatus to at least: responsive to receiving an authentication request comprising data indicative of a user identity via a first communications link between the user device and the first apparatus, selectively configure the first apparatus such that the user device is authorized to communicate with the first apparatus, wherein the authentication request is based on a first authentication protocol; and transmit a request for a credential of a second type to the second apparatus in response to receiving a request for said credential of the second type from the user device; the second apparatus comprises a second processor and at least one second memory, wherein the second processor and the at least one second memory are configured to cause the apparatus to at least: transmit a request for a credential of a first type via a second communications link between the second apparatus and a server in response to receiving the request for said credential of the second type from the first apparatus, wherein: the server is associated with the authentication realm and is arranged to authenticate the user device on the basis of a second authentication protocol, different to the first authentication protocol, and selectively allow the user device to communicate with the service in dependence on said authentication; said credential of the first type is for use by the second apparatus in obtaining a credential of a second type on behalf of the user device from the server, said request for the credential of the first type comprising data indicative of the user identity and being based on the second authentication protocol; responsive to receiving the credential of the first type, transmit a request for the credential of the second type on behalf of the user device via said second communications link, said credential of the second type being for use by the user device in establishing authenticated communication with the service via a third communications link between the user device and the service, said request for the credential of the second type comprising data indicative of the user identity and being based on the second authentication protocol; and in response to receiving the credential of the second type, transmit the credential of the second type to the first apparatus.

Embodiments also include a computer program comprising a set of instructions, which, when executed by a user terminal, cause the user terminal to perform a method according to the second embodiment.

Further features and advantages of the disclosure will become apparent from the following description of preferred embodiments of the disclosure, given by way of example only, which is made with reference to the accompanying drawings.

DETAILED DESCRIPTION OF CERTAIN INVENTIVE EMBODIMENTS

Figure 1:
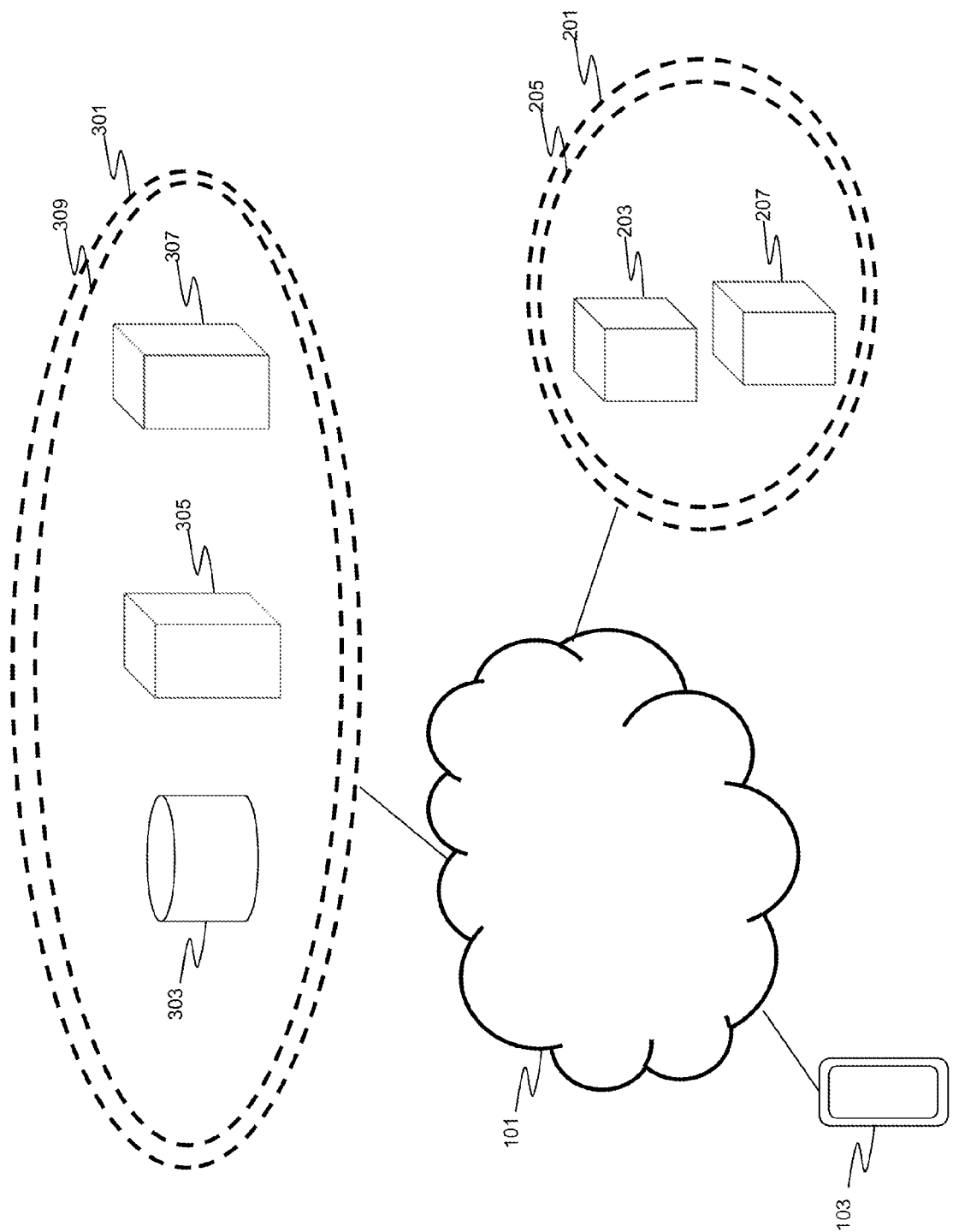
FIG. 1 is a simplified block diagram of a communication network within which embodiments operate.

Embodiments described in this disclosure are concerned with facilitating user devices to be authenticated in different networks, or more specifically authentication domains or authentication realms, in which each network may be configured to authenticate user devices on the basis of a different authentication protocol. In certain examples, embodiments are concerned with simultaneous authentication in different authentication domains, whilst allowing independent provisioning of their authentication credentials for the respective authentication domains. The processing involved in establishment of authenticated communication is described in detail below, but first an overview of a conventional network environment within which the embodiments of the disclosure operate will be described with reference to FIG. 1, which is a block diagram illustrating a communications network 101 which enables a user device 103 to communicate with authentication domains 201 and 301 (hereinafter referred to as first and second authentication domains).

The communication network 101 is configured to enable data communication between the user device 103 and the first and second authentication domains 201, 301, either directly or via a mediating network entity, such as a proxy server (not shown). The user device 103 is a remote device capable of establishing authenticated communication with the first and second authentication domains 201 and 301, and is associated with an identity of a corresponding user for at least the duration of the authenticated communication. The user device 103 may be equipped with a plurality of applications, at least some of which may be capable of communicating with one or more services provided or hosted by one or more servers in the authentication domains 201 and 301. Without limitation, the user device 103 may be a remote desktop computer, a smart phone such as an iPhone™, a tablet computer such as an iPad™, or a laptop computer.

In a preferred arrangement, such as where the user device 103 is a mobile computing device, the communication network 101 is operatively connected to a mobile network (not shown) to route packets to/from the user device 103, in which case the mobile network provides the user device 103 with wireless network connectivity. Without limitation, the mobile network can include Global System for Mobile Communications, General Packet Radio Service, Enhanced Data rates for GSM Evolution Universal Mobile Telecommunications System, 3G, Wi-Fi, Unlicensed Mobile Access and Generic Access Network. The components and entities forming the mobile network are well known to those skilled in the art.

The first and second authentication domains 201 and 301 selectively allow authorized user devices to access one or more services provided thereby, such as services provided by application servers 305 and 307 in the second authentication domain 301. The first and second authentication domains 201 and 301 could, for example, correspond to private networks, such as enterprise, organizational or closed-group networks, which are accessible only by registered user devices. One of both of the first and second authentication domains 201 and 301 could additionally or alternatively correspond to a provisioning network, which facilitates communication between the user device 103 and one or more private networks by, for example, provisioning software applications, configuration settings and/or security parameters such as encryption keys associated with the one or more private networks to authorized user devices. In this case, the communication between the user device 103 and a private network may be via a relevant one of the first or second domain 201 or 301. The first and second domains 201 and 301 may additionally comprise firewalls 205 and 309 respectively for security.

Each of the first and second authentication domains 201 and 301 may comprise an authentication server 203 and 303 (hereinafter referred to as first and second servers), which are configured to authenticate user devices and selectively allow user devices access to services provided by the respective first or second authentication domains 201 or 301. To that end, the first and second servers 203 and 303 may authenticate user devices on the basis of an authentication protocol, such as the Kerberos authentication protocol or an Authentication Token Protocol (ATP).

In an example conventional arrangement, the first server 203 is configured to authenticate the user device 103 on the basis of e.g. the Authentication Token Protocol (ATP) or the Password Authentication Protocol (PAP), while the second server 303 is configured to authenticate the user device 103 on the basis of the Kerberos authentication protocol. In this scenario the user device 103 generates an authentication request on the basis of the ATP comprising data indicative of a user identity and a corresponding user password for an associated user, and transmits the user identity and the user password to the first server 203. The first server 203 verifies whether the user identity corresponds to a registered user identity and whether the user password is valid, and, if the user credentials are validated, transmits an authentication response to the user device, thereby completing authentication in the first authentication domain 201.

Subsequent to authentication in the first authentication domain 201, the user device 103 separately generates a request message on the basis of the Kerberos authentication protocol comprising data indicative of the user identity, and transmits the message to a Key Distribution Centre (KDC) component of the second server 303. The KDC verifies whether the user identity corresponds to a registered user identity, i.e. a user identity that is registered for access to at least one of the services provided by application servers 305 and/or 307, and selectively provisions an authentication credential, specifically a Ticket Granting Ticket (TGT), to the user device 103 via a reply message, thereby completing authentication in the second authentication domain 301. In the context of the present disclosure services provided by the application servers 305 and 307 may be e.g. messaging services, such as email, a document management service, an application management service or a remote device management service.

Next, the user device 103 may transmit a request for a service credential comprising data indicative of the TGT to a Ticket Granting Service (TGS) component of the second server 303 in order to access the service provided by the application server 305 or 307. Responsive to receiving the request, the TGS verifies the TGT and selectively provisions a service credential, or a service token, which the user device 103 may present to the relevant service for access. For completeness, it is noted that in some embodiments the functionality provided by the second server 303 may be distributed, such that the TGT and the TGS components are be located on different servers.

Thus, with conventional authentication systems, the user device 103 will have to separately authenticate with each of the first and second authentication domains 201 and 301, which is inconvenient and cumbersome. To address this problem, authentication protocols, such as the Kerberos authentication protocol, include a constrained delegation mechanism (so-called "Kerberos Constrained Delegation" (KCD)), in which, for example, the first server 203, upon successfully authenticating the user device 103, may obtain a credential of a first type (hereinafter referred to as alias credential CRED1) from the second server 303, which enables it to obtain a credential of a second type (hereinafter referred to as service credential CRED2) on behalf of the user device 103. The first server 203 transmits the service credential CRED2 to the relevant one of the application servers 305 or 307, which then authenticates the user on the basis of the received service credential CRED2 and selectively establishes an authenticated communication with the user device 103. In other words, the first server 203 acts as a proxy for authentication of the user device 103 to the relevant application server which provides the service.

In some situations, the KCD-based cross-domain authentication mechanism cannot be used to access some conventional or legacy services which are not configured to authenticate user devices on the basis of the KCD based cross-domain authentication mechanism and/or which may have particular authentication requirements which are not known to the first server 203 which acts as the authentication proxy. In such situations, it is desirable for the service credential CRED2 to be communicated to the relevant application server by the user device 103 rather than the authentication proxy.

Figure 2:
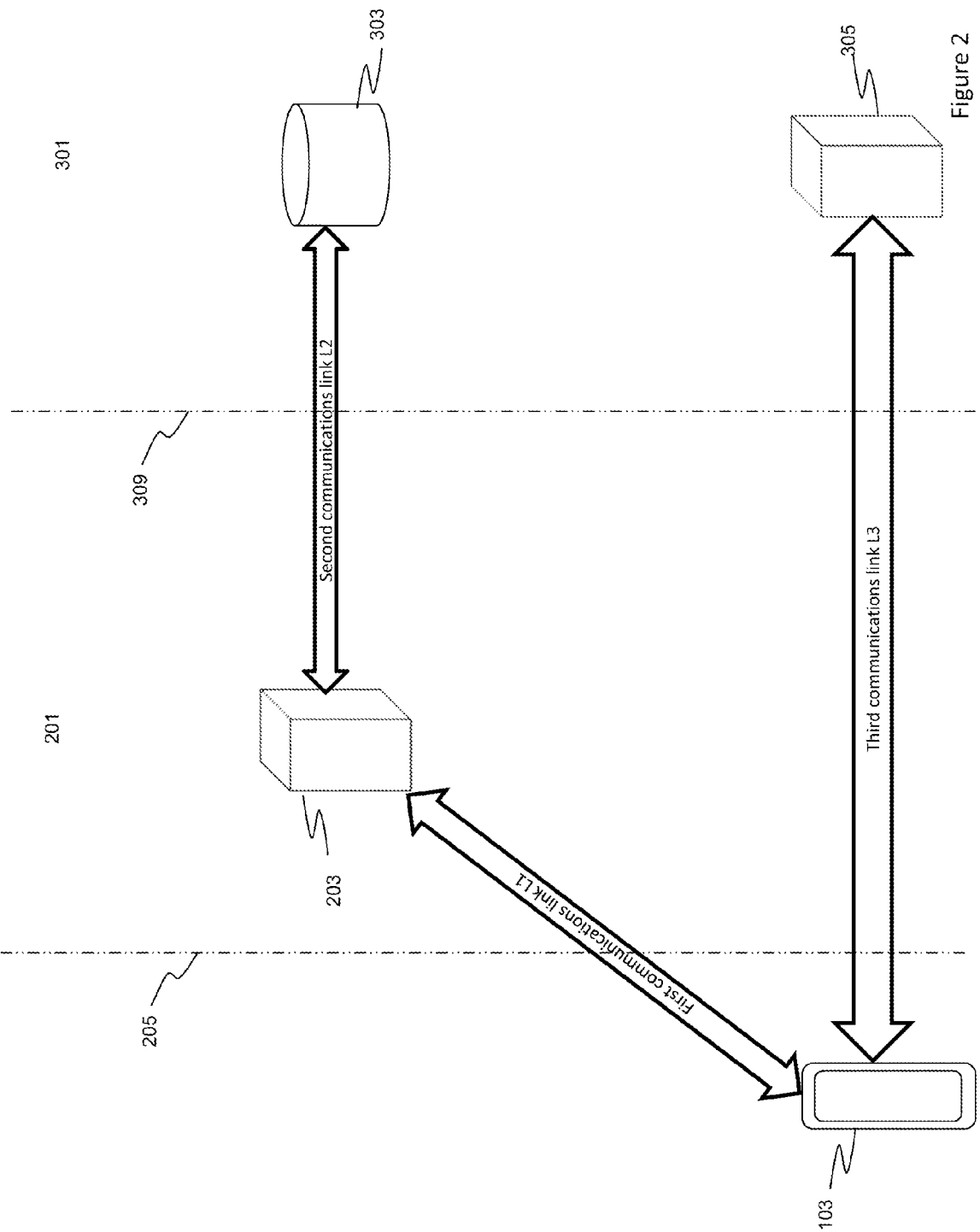
FIG. 2 is a block diagram that illustrates communication between various network entities according to embodiments.
Figure 3:
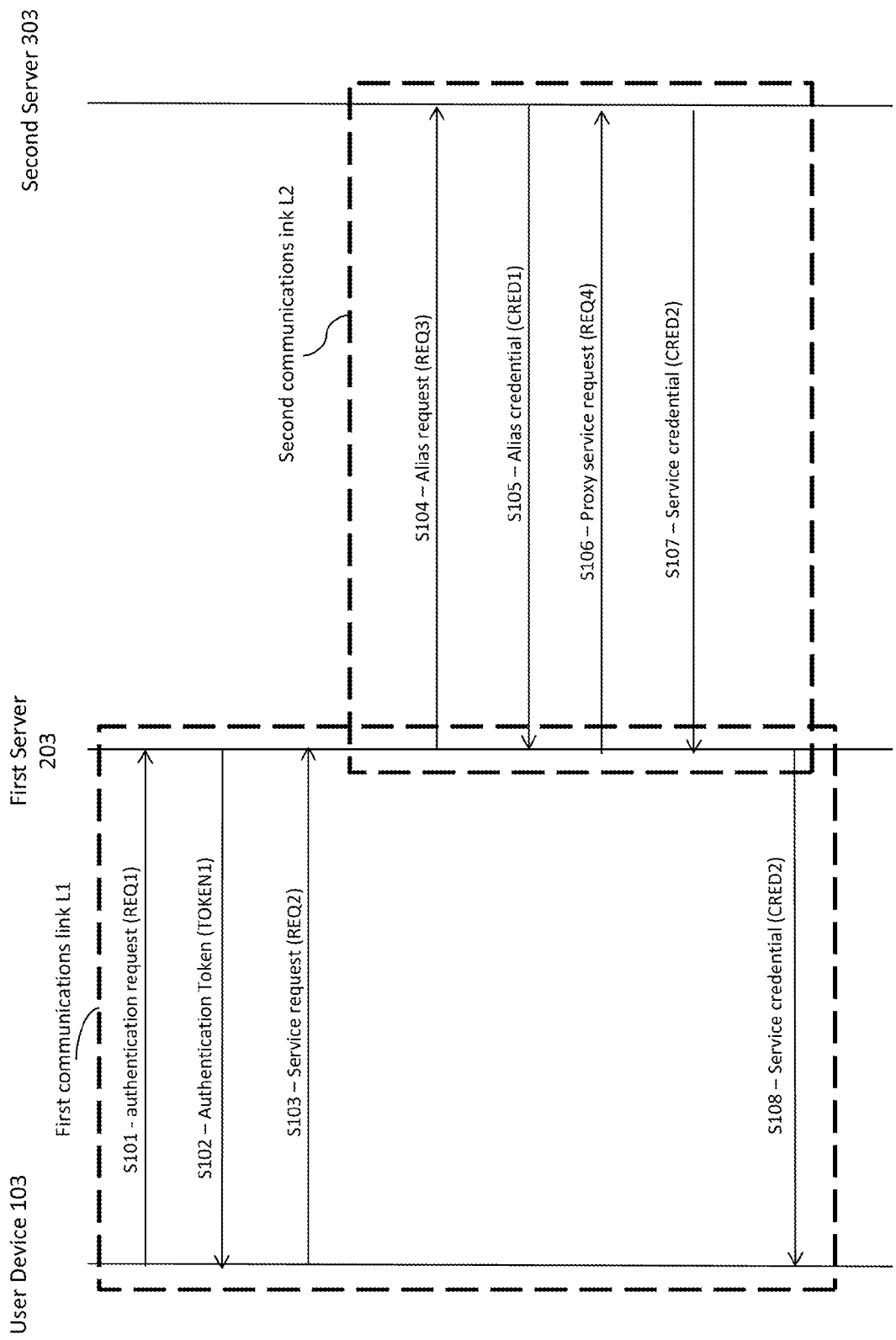
FIG. 3 is a flow diagram that illustrates the various steps performed by various network entities according to embodiments.

Referring to FIGS. 2 and 3, an embodiment according to the current disclosure will now be described. In this embodiment the first server 203 is configured to authenticate the user device 103 on the basis of a first authentication protocol, such as the afore-mentioned Authentication Token Protocol (ATP), whereas the second server 303 is configured to authenticate the user device 103 on the basis of a second authentication protocol, such as the Kerberos authentication protocol. The first and second servers 203 and 303 may additionally be configured with a cross-domain authentication mechanism, such as the above described KCD-based cross-domain authentication mechanism. While the ATP and Kerberos authentication protocols are examples, in general the second authentication protocol is different to the first authentication protocol.

Referring specifically to FIG. 3, in response to receiving an authentication request (hereinafter referred to as authentication request REQ1), which, for example, may be in accordance with the aforementioned ATP, the first server 203 is selectively configured such that the user device 103 is authorized to communicate therewith (step s101). This authentication request REQ1 comprises data indicative of the aforementioned user identity associated with the user device 103 and is received via a first communications link L1 between the first server 203 and the user device 103.

Without limitation, the authentication request REQ1 may be transmitted by the user device 103 when it is configured to communicate with the first server 203. In this case, the first server 203 provisions an authentication token TOKEN1 thereto for use in subsequent authentication requests (step s102). The provisioning of the authentication token TOKEN1 establishes a trust relationship between the user device 103 and the first server 203, which can used for subsequent authentication with the first server 203.

Additionally, the authentication request REQ1 may be transmitted when an application running on the user device 103 is configured to communicate with the services provided by the application servers 305 and/or 307, or when an application is installed on the user device 103. In this case, the first server 203 provisions an authentication token TOKEN1 in respect of the relevant one of the applications on the user device 103, and as a consequence establishes a trust relationship between the application and the first server 203 (step s102). This trust relationship can be subsequently leveraged when verifying whether or not an application running on the user device 103 is authorized to communicate with services provided by application servers in the first and/or second authentication domains 201 and 301 by, for example, authenticating the application on the basis of the authentication token TOKEN1.

Subsequently, the user device 103 and/or an application thereon may be authenticated on the basis of the authentication token TOKEN1 provisioned thereto, and in this case subsequent authentication requests to the first server 203 via the first communications link L1 comprise the provisioned authentication token TOKEN1.

In at least some arrangements, users may additionally be required to configure a password on the user device 103 for use by the user device 103 in authenticating the user. By verifying the user, the user device 103 establishes a further trust relationship therewith, and as a consequence prevents an unauthorized user from accessing the user device 103 and consequentially the services provided by the first and/or second authentication domains 201 and/or 301.

Additionally, at least some of the applications running on the user device 103 authenticate the user on the basis of, for example, one or more respective passwords to establish corresponding trust relationships between the user and the applications. Once the user has been authenticated to an application, the client application can authenticate the user to the first server 203 on the user's behalf and autonomously generate a said request for the credential of the second type. Thus, in at least some arrangements, authentication requests REQ1 that are transmitted to the first server 203 via the first communications link L1 are transmitted on the basis of one or more of: a trust relationship between the user and the user device 103; a trust relationship between the user and an application on the user device 103; availability of an authentication token TOKEN1 corresponding to the user device 103; and/or availability of an authentication token TOKEN1 corresponding to an application requesting access.

Subsequent to authenticating the user device 103, the first server 203 may initiate cross-domain authentication to allow the user device 103 and/or an application running thereon access to the services provided by the application servers 305 and/or 307, on the basis of authentication by the first server 203. Such a cross-domain authentication may, for example, be triggered in response to receiving a request (hereinafter referred to as service request REQ2) from the user device 103 and/or an application thereon requesting access to a service provided by one of the application servers 305 or 307 (step s103). In this case, the first server 203 transmits a request (hereinafter referred to as an alias request REQ3) for the aforementioned alias credential CRED1 (step s104). The alias request REQ3 is transmitted via a second communications link L2 between the first server 203 and the second server 303, and is based on the aforementioned second authentication protocol, namely the aforementioned Kerberos authentication protocol. The alias request REQ3 may comprise data indicative of the aforementioned user identity.

The communication over the second communications link L2, such as communication of the alias request REQ3, may be encrypted on the basis of, for example, a pre-shared secret key. Additionally or alternatively, the first and second servers 203 and 303 may mutually authenticate each other prior to communicating via the second communications link L2, thereby establishing a trust relationship between the first server 103 and the second server 203.

In response to receiving the alias request REQ3, the second server 303 generates the alias credential CRED1 and transmits it to the first server 203 via the second communications link L2, thereby enabling the first server 203 to obtain the aforementioned service credential CRED2 on behalf of the user device 103 from the second server 303 (step s105). The alias credential CRED1 may be issued in respect of some of the services provided by the application servers 305 and 307 associated with the second authentication domain 301, thereby restricting the first server 203 to obtain the aforementioned service credential CRED2 on behalf of the user device 103 in respect of the services for which it is authorized.

In response to receiving the alias credential CRED1 via the second communications link L2 (step s104), the first server 203 transmits a request (hereinafter referred to as proxy service request REQ4) for the service credential CRED2 on behalf of the user device 103 via the second communications link L2 (step s106). The proxy service request REQ4 may be in relation to one of the services 305 or 307 associated with the second domain 301, and comprise the aforementioned user identity. The proxy service request REQ4 is based on the aforementioned second authentication protocol, namely the aforementioned Kerberos authentication protocol.

In response to receiving the service credential CRED2 via the second communications link L2 (step s107), the first server 203 transmits the service credential CRED2 to the user device 103 via the first communications link L1 (step s108). Subsequently, the user device 103 may establish authenticated communication with the corresponding service 305 or 307 via a third communications link L3 between the service 305 or 307 and the user device 103.

Subsequent to receiving the service credential CRED2, the user device 103 may generate and transmit an access request (hereinafter referred to as access request REQ5, not shown in FIG. 3) comprising data indicative of the service credential CRED2 via the third communications link L3 between the user device 103 and the relevant application server 303, 305. As will be discussed in more detail below with reference to FIG. 5, the access request REQ5 may be transmitted in response to an authentication challenge from the requested service provided by application server 305 or 307. The user device 103 may additionally be configured to generate the access request REQ5 in accordance with a specific protocol or format required by the requested service to establish authenticated communication. In some scenarios, an application server may not be configured to accept authentication requests in accordance with the authentication protocol of first server 203 and/or be able to accept authentication requests from the first server 203 on behalf of the user device 103. Embodiments therefore enable authenticated communications when a service provided one or both of the application servers 305 or 307 requires an authentication protocol or message format that is not compatible with the cross-domain authentication protocol that the first and second servers 203 and 303 are configured with.

Moreover, in some embodiments, a service provided by one of the application servers 305 or 307 may have strict requirements as to the content of the access request REQ5, which may have been notified to the user device 103 via the authentication challenge or during a protocol negotiation phase to establish the specific authentication protocols to be used for processing the access request REQ5. Such requirements or specific configuration parameters for processing the access request REQ5 may not be known to the first server 203, and as a consequence the first server 203 may not be able to generate a suitable access request for access to the service. Thus, embodiments ensure that access requests, such as access request REQ5, and transmitted to the services by an appropriately enabled and configured device.

Figure 4:
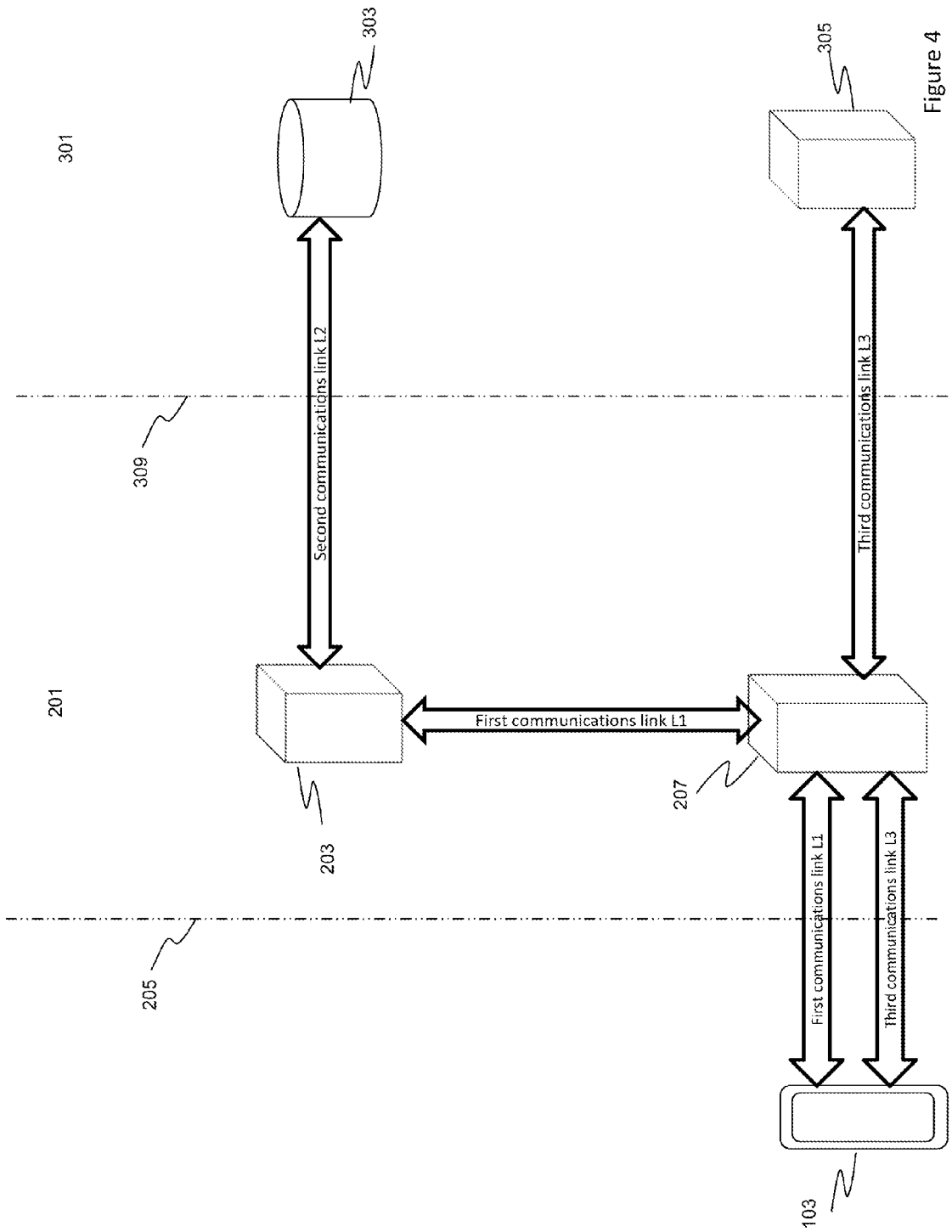
FIG. 4 is a block diagram that illustrates communication between various network entities according to embodiments.

An overview of an arrangement in which the user device 103 communicates with the first and second servers 203 and 303 via a mediating network entity 207, such as a proxy server associated with the first authentication domain 201, will now be described with reference to FIG. 4. In this case, the first communications link L1 for communication of the authentication request REQ1 and the third communications link L3 for communication with the services 305 and/or 307 may be established via the mediating network entity 207. For completeness, it is noted that the mediating network entity 207 may alternatively be associated with the second authentication domain 301 or a further authentication domain.

In at least some arrangements, the user device 103 may be configured with a plurality of applications, at least some of which may be authorized to communicate with the services provided by application servers 305 and/or 307 via the aforementioned third communications link L3. In this case, the first server 203 may maintain a record comprising data indicative of at least one of the applications that is authorized to communicate with the services via the third communications link L3 to establish authenticated communication therewith. The first server 203 may selectively transmit the proxy service request REQ4 at step 106 in dependence on this record. By controlling transmission of the proxy service request REQ4, the first server 203 prevents an unauthorized application from establishing authenticated communication with the services provided by application servers 305 and/or 307. To that end and as described above, at least some of the applications may be provisioned with an authentication token that establishes a trust relationship between an application and the first server 203. In this case, the service request REQ2 at step 103 may comprise data indicative the authentication token TOKEN1 corresponding to the application requesting access, and the first server 203 may verify the application on the basis of the received authentication token TOKEN1 and selectively transmit the alias request REQ3 and/or the proxy service request REQ4 on the basis of this verification.

Additionally, at least some of the applications may be associated with an application identifier, and the user device 103 may include data indicative of an application identifier corresponding to an application requesting access to the services hosted by application servers 305 or 307 in the service request REQ2 transmitted at step s103. The first server 203 may then use the received application identifier to verify whether it corresponds to an authorized application, and selectively transmit the alias request REQ3 and/or the proxy service request REQ4 on the basis of this verification.

Such a record comprising data indicative of the authorized applications may additionally or alternatively be maintained at the user device 103. In this case, the user device 103 may selectively transmit the service request REQ2 at step 103 in dependence on this record. For example, if an unauthorized application requests access to the services 305 and/or 307, the user device 103 may not send the service request REQ2, thereby restricting access to the services 305 and/or 307 by authorized applications.

In an exemplary arrangement, the aforementioned service credential CRED2 may be encrypted on the basis of, for example, a key corresponding to the first server 203, or on the basis of a shared secret between the first and second servers 203 and 303. In this case, the first server 203 may decrypt the service credential CRED2 on the basis of the key or the shared secret, and then transmit the decrypted service credential CRED2 via the first communications link L1.

The first server 203 may additionally or alternatively transmit a portion of the service credential CRED2 via the first communications link L1 to the user device 103. Such a portion may, for example, include one or more of a session key, a network address, the aforementioned user identity, and a validity time period associated with the credential of the second type. The portion of the service credential CRED2 may be for use in generating the aforementioned access request REQ5, and may contain parts which are required for the generation of the access request REQ5.

Figure 5:
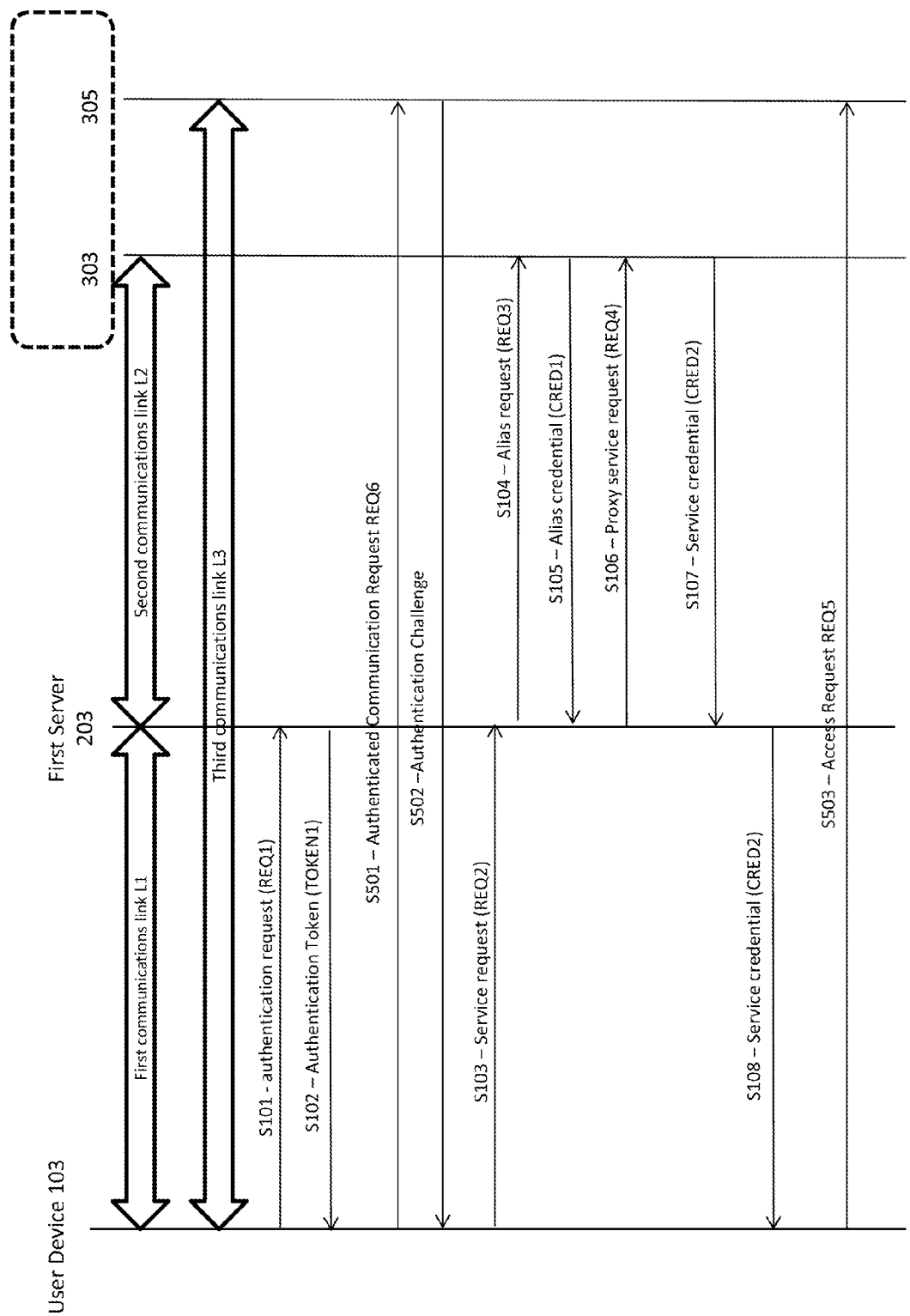
FIG. 5 is a flow diagram that illustrates the various steps performed by various network entities according to embodiments.

An overview of a further arrangement in which the first server 203 is arranged to transmit the aforementioned service request REQ2 in response to receiving an authentication challenge will now be described with reference to FIG. 5. In this arrangement the user device 103 may, for example, transmit a request to access the service provided by application server 305 (hereinafter referred to as authenticated communication request REQ6) via the third communications link L3 for receipt by the service 305 (step s501), and in response may receive an authentication challenge therefrom via the third communications link L3 (step s502). In response to the authentication challenge, the user device 103 may transmit the aforementioned service request REQ2 via the first communications link L1 to the first server 203 (step s103).

The first server 203 proceeds with transmitting the proxy service request REQ4 if it has previously received the alias credential CRED1 (step s105). If not, the first server 203 transmits the aforementioned alias request REQ3 whereby to obtain the alias credential CRED1 (previously described steps s104 and s105) before transmitting the proxy service request REQ4 (previously described s106). The first server 203 may alternatively transmit the alias request REQ3 in response to receiving the aforementioned authentication request REQ1. For completeness, the first server 203 may selectively transmit the alias and/or the service requests REQ3 and REQ4 in dependence on the authentication of the user device 103 on authentication state associated with the user device 103 in the first authentication domain 201.

As described above, subsequent to receiving the service credential CRED2 via the second communications link L2 (previously described s107), the first server 203 transmits it via the first communications link L1 to the user device 103 (previously described s108). The user device 103 may then generate and transmit the aforementioned access request REQ5 comprising data indicative of the service credential CRED2 via the third communications link L3 to the service 305, thereby authenticating the user device 103 to the service provided by application server 305 (step s503).

In an exemplary arrangement, the first server 203 may selectively transmit the aforementioned alias and/or proxy service requests REQ3 and REQ4 on the basis of a predetermined criterion, thereby enforcing a policy, which may, for example, have been specified by the second server 303. The predetermined criterion may, for example, include one or more of: a geographical location of the user device 103, a network address associated with the user device 103, an authorization state associated with the user device 103, one or more applications on the user device 103, usage history, an authorization state associated with the user identity and/or an operational state associated with the user device 103.

In at least some arrangements, the aforementioned alias credential CRED1 may be associated with a predetermined validity period. In this case, the first server 203 may be configured to monitor for expiry of the predetermined validity period. Subsequent to expiry of the predetermined validity period, the first server 203 may cause issuance of a further alias credential CRED1 by, for example, transmitting a further alias request REQ3 via the second communications link L2, thereby maintaining its ability to obtain a further service credential CRED2 on behalf of the user device 103. The further alias request REQ3 may alternatively or additionally be transmitted by the first server 203 in response to a further service request REQ2 via the first communications link L1 from the user device 103.

Alternatively or additionally, the service credential CRED2 may be associated with a further predetermined validity period, and the first server 203 may monitor for expiry thereof. Subsequent to expiry of the further predetermined validity period, the first server 203 may cause issuance of a further service credential CRED2 by, for example, transmitting a further proxy service request REQ4 via the second communications link L2, thereby allowing the user device 103 to maintain authenticated communication with the service 305 or 307. The further proxy service request REQ4 may alternatively or additionally be transmitted in response to a request from the user device 103 regarding the same via the first communications link L1. In an alternative arrangement, the monitoring of the further predetermined validity period may be performed at the user device 103, which may cause issuance of the further service credential CRED2 by, for example, transmitting a further service request REQ2 to the first server 203 via the first communications link L1.

For completeness, the proxy service request REQ4 for issuance of the service credential CRED1 and/or the further proxy service request REQ4 for issuance of the further service credential CRED1 may be transmitted by the first server 203 via the second communications link L2 in response to a request therefor from the user device 103 via the first communications link L1.

In at least some arrangements, the aforementioned second authentication protocol used for authenticating the user device 103 by the second server 303 is a Kerberos-based authentication protocol, and may additionally be configured in accordance with the aforementioned KCD-based cross-domain authentication mechanism. In this case, the alias and the service credentials CRED1 and CRED2 may comprise a Ticket Granting Service (TGS).

It is to be noted that the functionality of each of the first and second servers 203 and 303 may be embodied as a single computing device, or as a distributed system comprising a cluster of computing systems.

Figure 6:
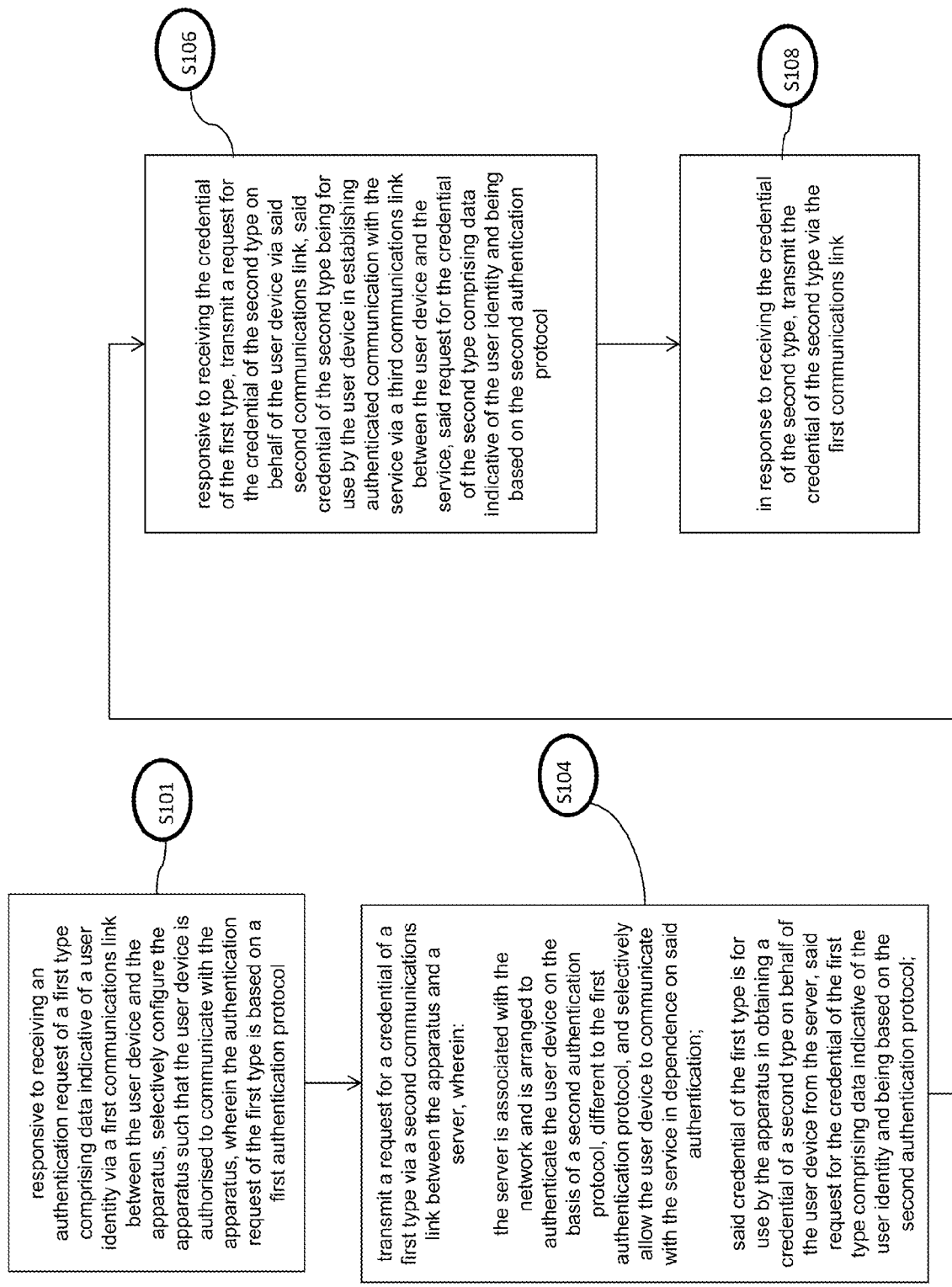
FIG. 6 is a logic flow diagram that illustrates the operation of a method, and a result of computer program instructions embodied on a computer readable memory, in accordance with exemplary embodiments.

FIG. 6 is a logic flow diagram which describes, broadly, the above exemplary embodiments from the perspective of a first server 203. As described above, the first server 203 facilitates authenticated communication between the user device 103 and a service provided by the applications servers 305 and/or 307 associated with the second authentication domain 301. In response to receiving the aforementioned authentication request REQ1 comprising data indicative of the aforementioned user identity via the aforementioned first communications link L1 between the user device 103 and the first server 203, the first server 203 selectively configures itself such that the user device 103 is authorized to communicate therewith, in which the authentication request REQ1 is based on a first authentication protocol (step s101). Thereafter, the first server 203 transmits the aforementioned alias request REQ3 via the aforementioned second communications link L2 between the first and the second servers 203 and 303, in which the alias request REQ3 is based on the second authentication protocol (step s104). In response to receiving the alias credential CRED1, the first server 203 transmits the aforementioned proxy service request REQ4 via the second communications link L2, in which the proxy service request REQ4 comprises data indicative of the user identity and is based on the second authentication protocol (step s106). In response to receiving the service credential CRED2, the first server 203 transmits it via the first communications link L1 for receipt by the user device 103 (step s108). Whereupon, the user device 103 may establish authenticated communication with the service provided by application servers 305 or 307 on the basis of the service credential via the third communications link L3 between the application servers 305 or 307 and the user device 103.

Figure 7:
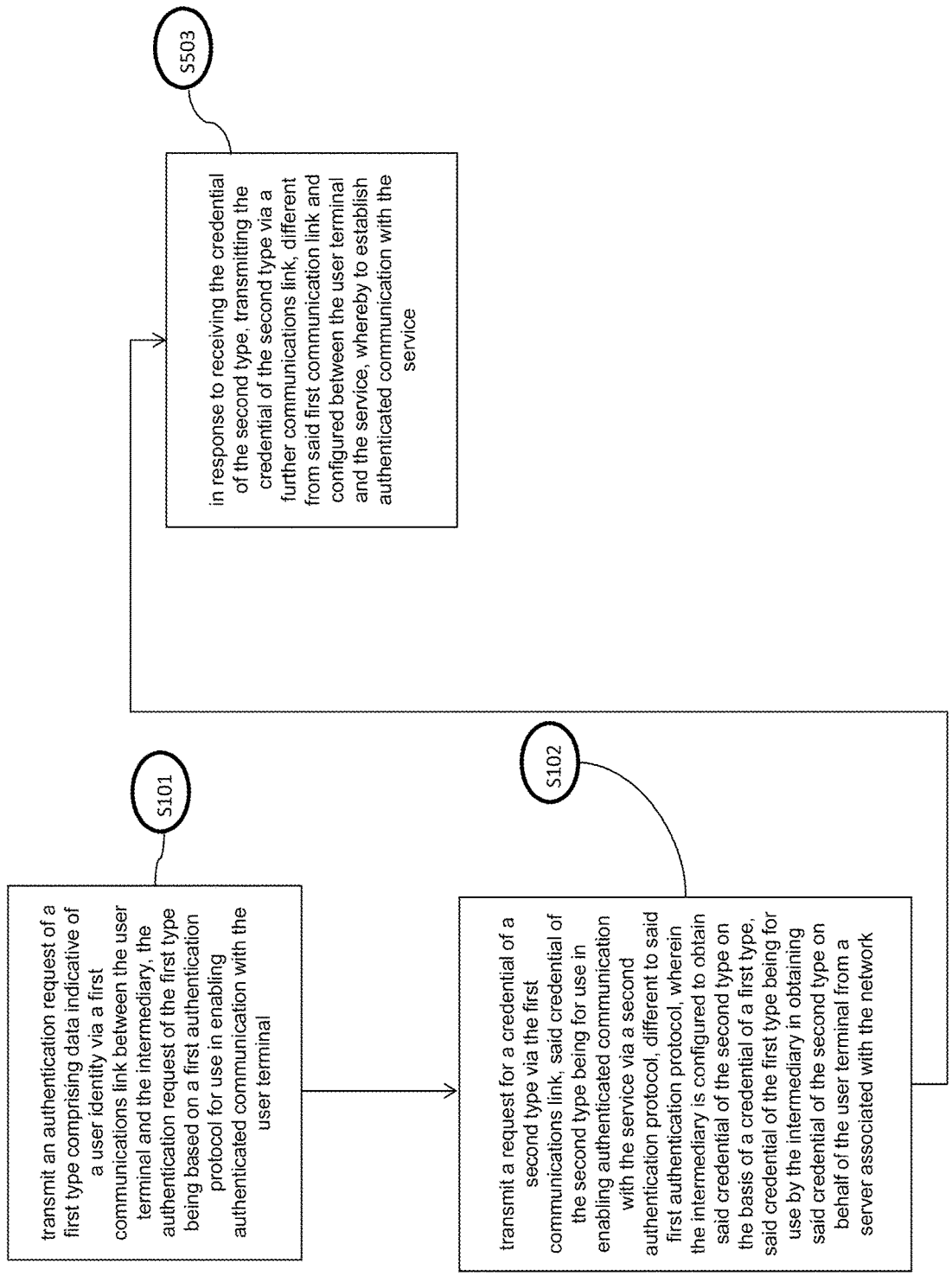
FIG. 7 is a logic flow diagram that illustrates the operation of a method, and a result of computer program instructions embodied on a computer readable memory, in accordance with exemplary embodiments.

FIG. 7 is a logic flow diagram which describes, broadly, the above exemplary embodiments from the perspective of the user device 103. As described above, the user device 103 may transmit the aforementioned authentication request REQ1 comprising data indicative of the user identity via the first communications link L1, in which the authentication request REQ1 is for use in establishing authenticated communication with the first server 203 and is based on the first authentication protocol (step s101). Thereafter, the user device 103 transmits the aforementioned service request REQ2 via the first communications link L1 to an intermediary, i.e. the first server 203, and being for use in establishing authenticated communication with the service 305 or 307 via the second authentication protocol (step s103). In response to receiving the service credential CRED2, the user device 103 transmits data indicative of the service credential CRED2 via the third communications link L3 between the service 305 or 307 and the user device 103, whereby to establish authenticated communication with the service 305 or 307 (step s503).

Figure 8:
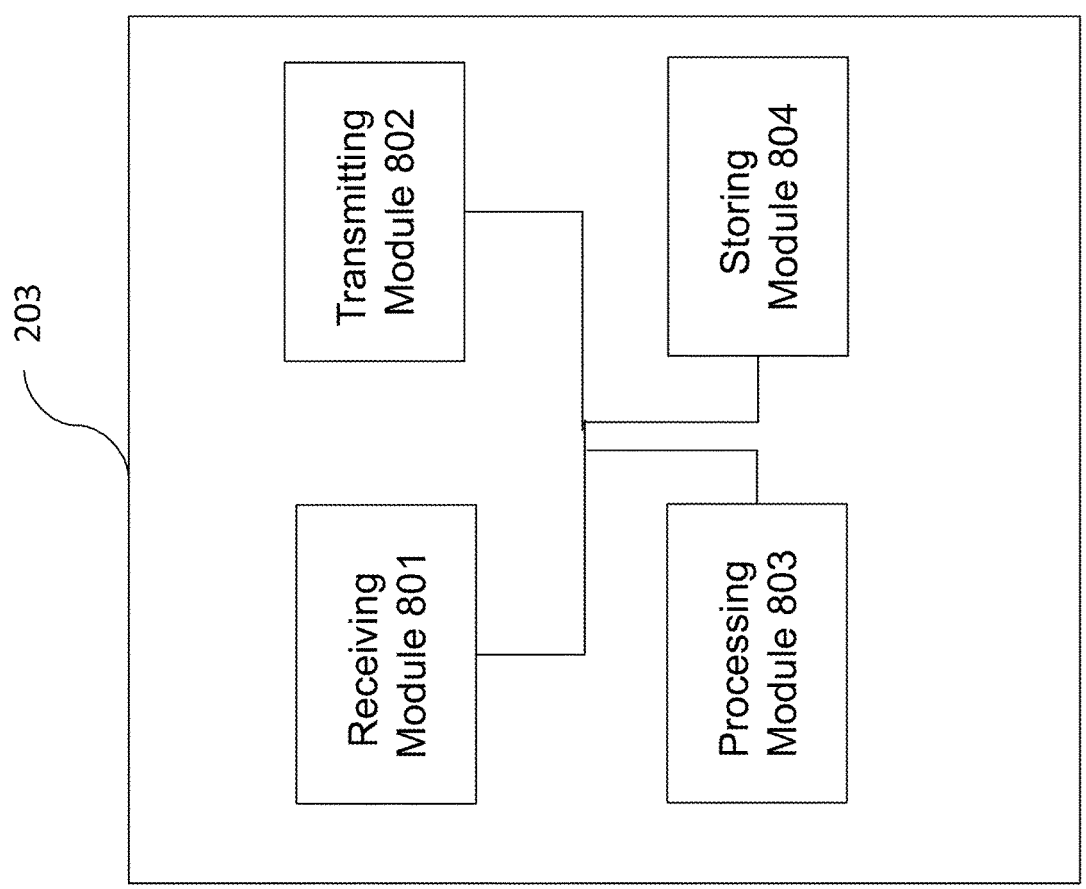
FIG. 8 is a simplified block diagram of authentication server, which is an exemplary electronic device for use in practicing the exemplary embodiments.

FIG. 8 is a functional block diagram of an exemplary first server 203. As shown, the first server 203 may comprise a processing module 803, a storing module 804, a receiving module 801 and a transmitting module 802. The processing module 803 may correspond at least in some aspects to, for example, a processor as discussed herein. The storing module 804 may correspond at least in some aspects to, for example, a memory as discussed herein. The receiving module 801 may correspond at least in some aspects to, for example, a processor, a receiver and/or a transceiver as discussed herein. The transmitting module 802 may correspond at least in some aspects to, for example, a processor, a transmitter and/or a transceiver as discussed herein.

Figure 9:
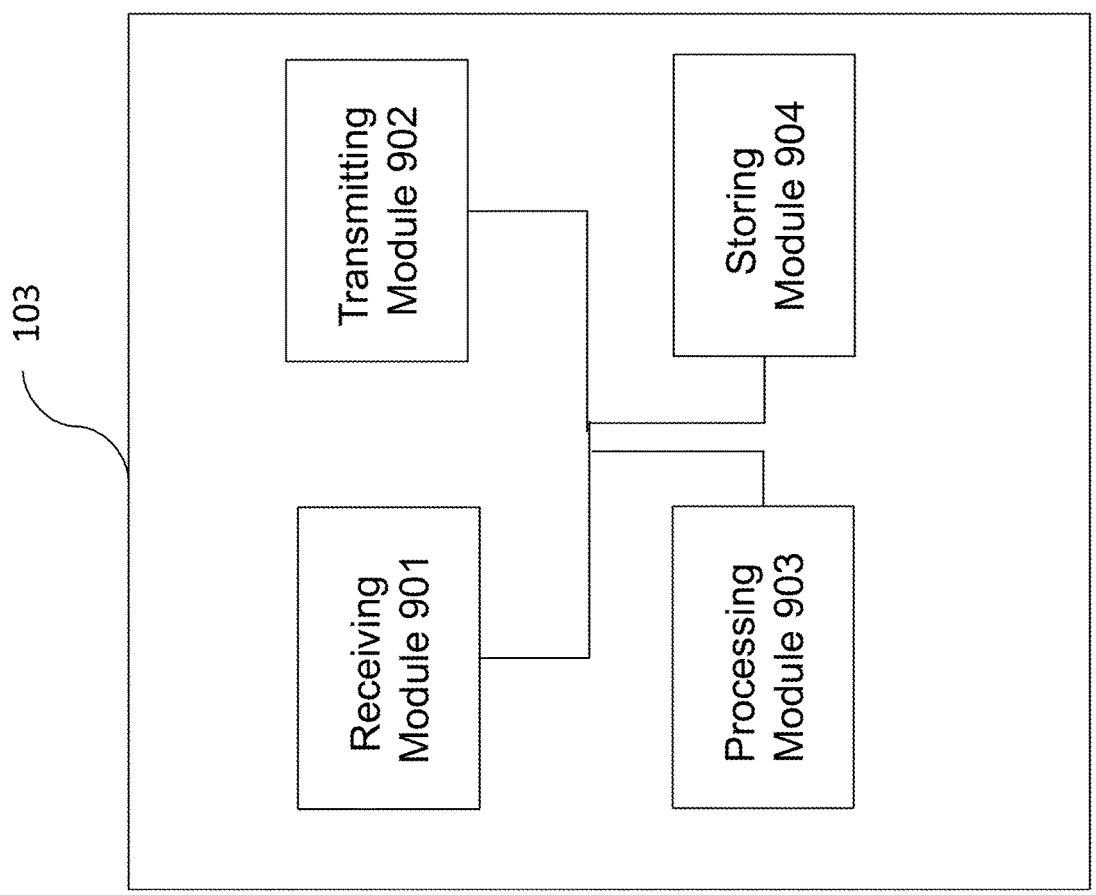
FIG. 9 is a simplified block diagram of authentication server, which is an exemplary electronic device for use in practicing the exemplary embodiments.

FIG. 9 is a functional block diagram of an exemplary user device 103. As shown, the user device 103 may comprise a processing module 903, a storing module 904, a receiving module 901 and a transmitting module 902. The processing module 903 may correspond at least in some aspects to, for example, a processor as discussed herein. The storing module 904 may correspond at least in some aspects to, for example, a memory as discussed herein. The receiving module 901 may correspond at least in some aspects to, for example, a processor, a receiver and/or a transceiver as discussed herein. The transmitting module 902 may correspond at least in some aspects to, for example, a processor, a transmitter and/or a transceiver as discussed herein.

The functionality of the modules of FIGS. 8 and 9 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

For example, the modules may be implemented, at least in part, as program instructions for execution by a processor, as logic circuits, as an application specific integrated circuit, as firmware, etc. For example, the embodiments can be implemented as one or more software or firmware applications, computer-implemented methods, program products stored on a computer useable medium, for execution on one or more processors (e.g., CPU, microcontroller) or other computing devices in a wireless station.

More particularly, the first server 203 and/or the user device 103 of the above some embodiments may be configured to operate according to the above some embodiments by executing computer programs held in computer readable media. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray™ disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Figure 10:
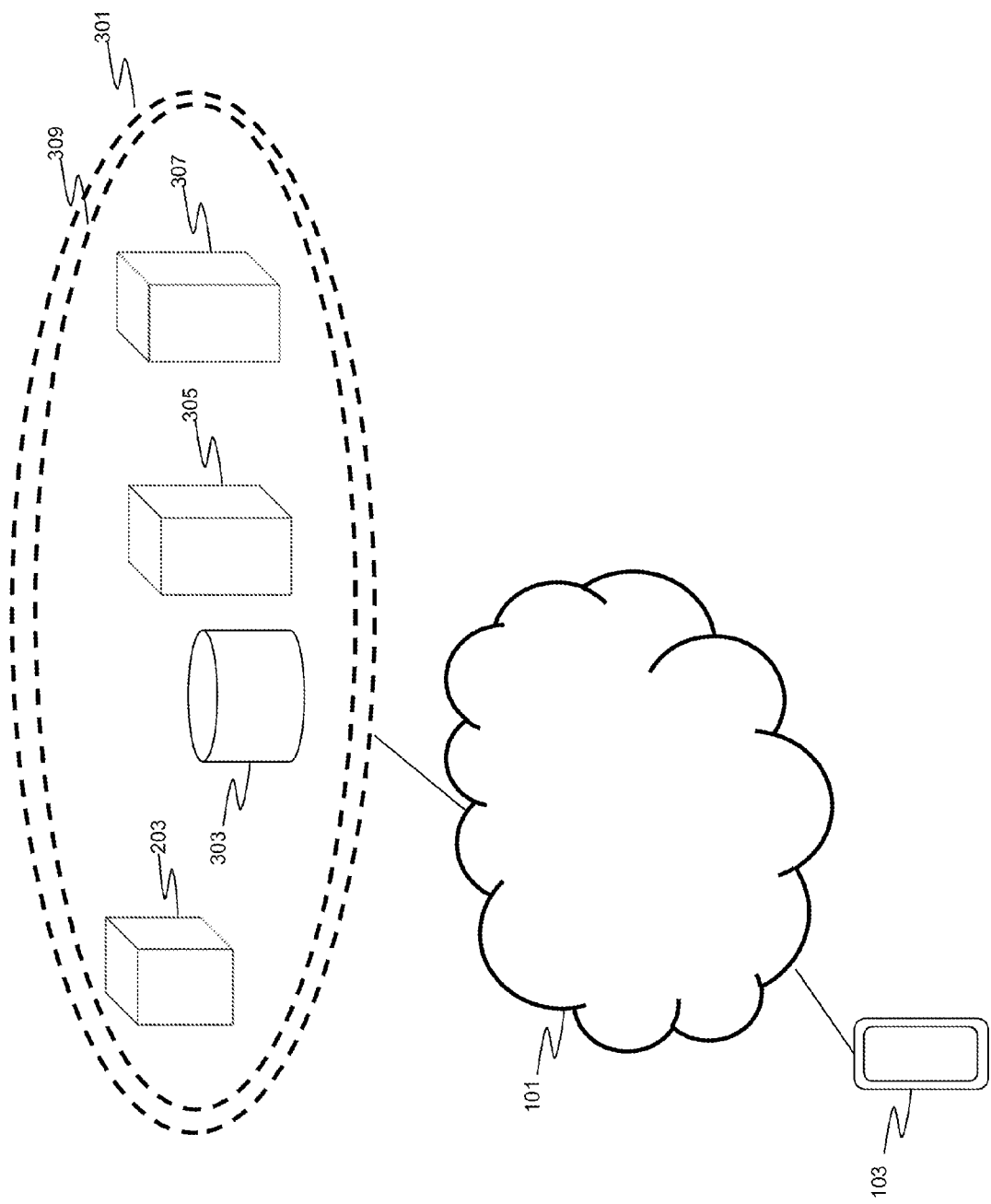
FIG. 10 is a simplified block diagram of a communication network according an embodiment.

In the embodiments described above the first server 203 and the second server 303 are located in the first authentication domain 201 and the second authentication domain 301 respectively. In some further embodiments, the first server 203 and second server 303 may be located in the same authentication domain, thereby potentially simplifying establishment of the second communications link L2 described above. An example of such an embodiment is shown in FIG. 10, according to which the first server 203, the second server 303 and application servers 305 and 307 are all located in the first domain 201. In this example, the first server 203 may be an authentication server which is configured to control access to the first domain from the user device 103, and the second server 303 may be a directory server which is configured to manage access to the services 305 and 307 in the manner described above. In this respect, the services provided by the application servers 305 and 307 may be within an authentication realm administered by the second server 303 but may fall outside the scope of control provided by the first server 203. Thus, according to these embodiments, the second server 303 may delegate authentication of the user device 103 to the first server 203 in the manner described above with reference to FIGS. 2 to 7. That is, the trust relationship between the first server 203 and the second server 303 is established within the same authentication domain 301 and no cross-domain communication is required. In this respect, authentication communications between the user device 103 or an application running on the user device 103, and a service provided by the application server 305 and 307 can established according to the methods described above with reference to FIGS. 2 to 7.

It will be apparent from the above discussion that a trust relationship between the first server 203 and the second server 303 enables delegation of user device authentication to the first server 303 by the second server 303. Thus, when the first server 303 receives a service request from the user device 103, the first server 203 can fulfil the service request by virtue of a trust relationship with the second server 303 which controls access to the application servers 305 and 307 on which the server is hosted. Thus, it is desirable to ensure that the service request from the user device 103 is directed or forwarded to an appropriate first server 203 which has an established trust with the appropriate second server 303 for the requested service.

Figure 11:
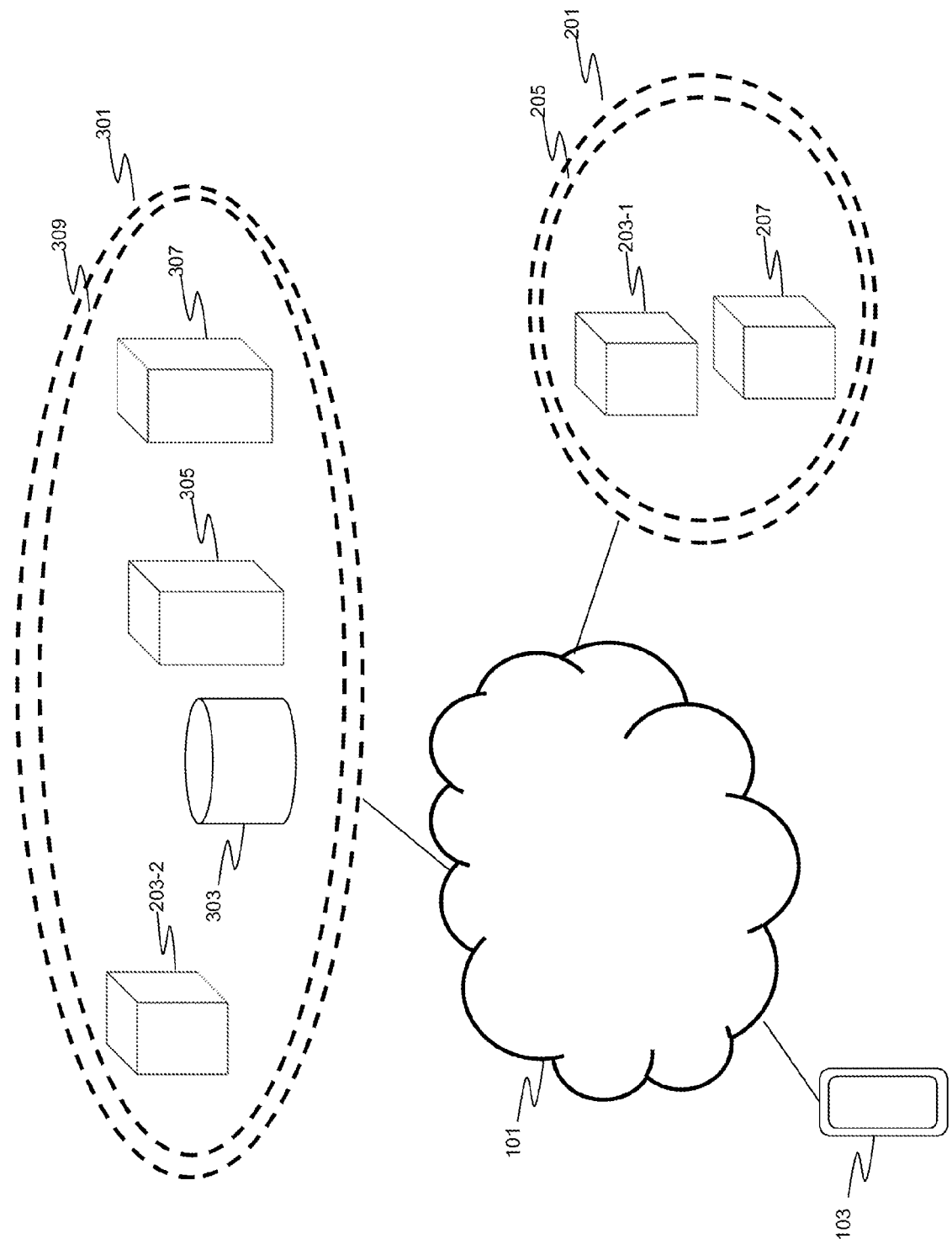
FIG. 11 is a simplified block diagram illustrating communication between various network entities according to an embodiment.

FIG. 11 shows a variation of the communications network 101 of FIG. 1, according to which a plurality of first servers are available to the user device 103 for the purpose of authentication and access to resources in the respective authentication domains. Specifically, the communications network 101 shown in FIG. 11 includes a first authentication server (first server 203-1) and a second authentication server (first server 203-2) which are located in the first authentication domain 201 and the second authentication domain 301 respectively. According to this embodiment, the second server 303 is configured to delegate authentication of the user device 103 to the first server 203-2 located in the second authentication domain 301, but is not configured to delegate authentication of the user device 103 to first server 203-1 located in the first authentication domain 201. In other words, only the first server 203-2 located in the second authentication domain 301 is able to acts as a proxy for requests for service credentials in respect of the services provided by the application servers 305 and 307.

According to some embodiments, the user device 103 of FIG. 11 is configured to determine which of the first servers 203-1 and 203-2 is able to obtain an appropriate service credential for the purposes of accessing a service provided by the application servers 305 and 307. Typically, this determination may be based on the network address of the service to which the user device wishes to connect, on the assumption that the appropriate second server 303 will reside in the same authentication domain as the desired service. For example, where the requested service is associated with the network address service.domain1.good.com (e.g. a service provided by an application server in the first authentication domain 201) the user device may determine that it should authenticate to a first server located in the domain1.good.com domain (e.g. first server 203-1). Conversely, where the requested service is associated with the network address service.domain2.good.com (e.g. a service provided by an application server in the second authentication domain 301) the user device may determine that it should authenticate to a first server located in the domain2.good.com domain (e.g. first server 203-2). In this manner, the user device is configured to authenticate to the first server which is most likely to be able to function as a proxy for a service request to the desired service. It will be further appreciated that the determination of appropriate first server can also be performed by applications running on the user device 103 on a per-application basis.

In some embodiments, determination of an appropriate first server to which the service request should be addressed may be determined by one of the first servers 203-1 and 203-2 and returned to the user device for subsequent processing. For example, upon receipt of a service request at a first server which is unable to obtain an appropriate service credential, the first server may determine or look up the identity of one or more suitable first servers and return the results of the lookup to the user device 103. Moreover, further embodiments may provide a dedicated lookup service which is configured to determine the appropriate second server in response to lookup requests received from the user device 103.

Figure 12:
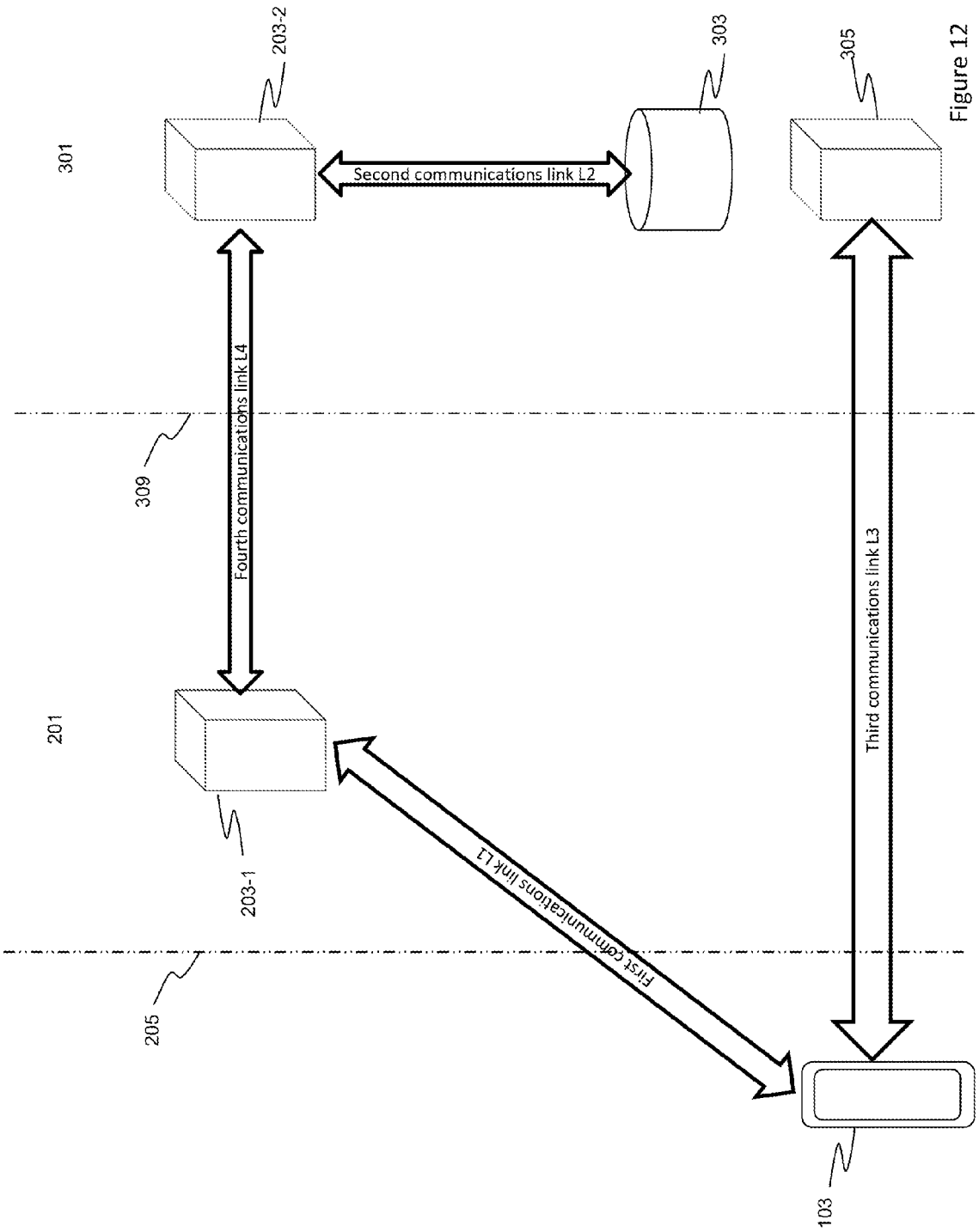
FIG. 12 is a flow diagram that illustrates the various steps performed by various network entities according to an embodiment.

According to further embodiments, the first servers 203-1 and 203-2 of FIG. 11 may be configured to forward a service request to an appropriate second server in the event that it cannot be fulfilled by the second server at which it was received (and vice-versa). To facilitate this forwarding of the service request, the first servers 203-1 and 203-2 establish an authenticated communications link between them (referred to hereinafter as a "fourth communications link L4"), such that the chain of trust originating from the user device 103 can be extended to an appropriate second server for fulfilment of the service request. An example of the fourth communications link L4 and the corresponding extension of trust from the user device 103 to the second server 303 via the first servers 203-1 and 203-2 is shown in FIG. 12. According to this example, the first server 203-1 associated with the first domain 201 receives a service request from the user device 103 and forwards the service request to the first server 203-2 associated with the second domain 301.

Figure 13:
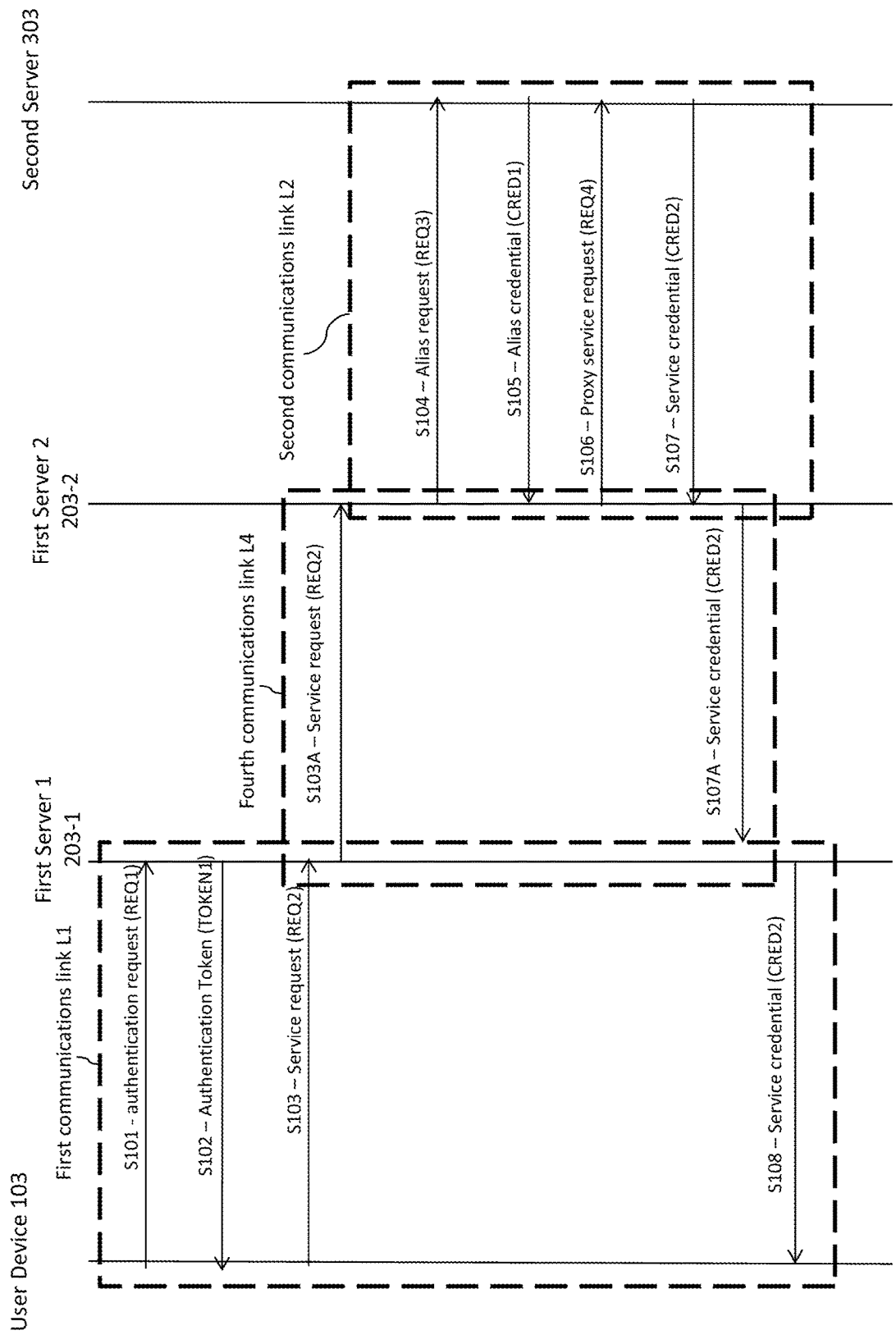
FIG. 13 is a diagram that illustrates the various communications between the network entities according to an embodiment.

FIG. 13 shows the various communications between the network entities shown in FIG. 12 in the event that the first server 203-1 is unable to fulfil a service request received from the user device 103. According to this embodiment, the user device sends an authentication request (REQ1) to the first server 203-1 associated with the first authentication domain 201 (step s101). As discussed above with reference to FIG. 3, the authentication request (REQ1) typically comprises data indicative of the user identity associated with the user device 103 and is received via a first communications link L1 between the first server 203-1 and the user device 103. Next, the first server 203-1 provisions an authentication token TOKEN1 in respect of the user device 103, and as a consequence a trust relationship between the application and the first server 203-1 is established (step s102).

Next, the user device 103 sends a service request (REQ2) associated with a service provided by one of the application servers 305 and 307 to the first server 203-1 associated with the first domain 201. In response to receipt of the service request (REQ2), the first server 203-1 determines whether it has established a trust relationship with an appropriate second server which is able to provide a service credential for the requested service. As discussed above, this determination may be based, at least in part, on an identifier associated with the requested service included in the service request, such as a network address, from which the first server 203-1 can determine the domain in which the requested service is located. In the present embodiment, the first server 203-1 determines that the requested service is located in the second authentication domain 301 and accordingly forwards the service request (REQ2) together with the user identifier to the first server 203-2 located in the second authentication domain 301 via the fourth communication link L4 (step s103A).

Upon receipt of the forwarded service request (REQ2) at the first server 203-2 located in the second authentication domain 301, the first server 203-2 proceeds to request an alias credential and obtain a service credential in the manner described above with reference to FIG. 3. Specifically, the first server 203-2 transmits an alias request REQ3 for the alias credential CRED1 (step s104) via the second communications link L2 to the second server 303 (step s104). In response to receiving the alias request REQ3, the second server 303 generates the alias credential CRED1 and transmits it to the first server 203-2 via the second communications link L2, thereby enabling the first server 203-2 to obtain the aforementioned service credential CRED2 on behalf of the user device 103 from the second server 303 (step s105). The alias credential CRED1 may be issued in respect of some of the services provided by the application servers 305 and 307 associated with the second authentication domain 301 as discussed above.

In response to receiving the alias credential CRED1 via the second communications link L2 (step s104), the first server 203-2 transmits a proxy service request for the service credential CRED2 on behalf of the user device 103 via the second communications link L2 (step s106) and, in response to receiving the service credential CRED2 via the second communications link L2 (step s107), the first server 203-2 transmits the service credential CRED2 to the first server 203-1 associated with the first authentication domain 201 (step 107A). In turn, the first server 203-1 associated with the first authentication domain 201 forwards the service credential CRED2 to the user device 103 (step S 108), which proceeds to establish authenticated communication with the requested service provided by application servers 305 or 307 via the third communications link L3.

The above embodiments are to be understood as illustrative examples of the disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method of facilitating authenticated communication between a user device and a service associated with a network via an intermediary system comprising at least one intermediary apparatus, the method comprising:
    responsive to receiving an authentication request comprising data indicative of a user identity via a first communications link between the user device and the intermediary system, selectively configuring the intermediary system to where the user device is authorized to communicate with the intermediary system, wherein the authentication request is based on a first authentication protocol; thereafter:
    transmitting, by the intermediary system, a request for a credential of a first type via a second communications link between the intermediary system and a server, wherein:
        the server is associated with the network and is arranged to authenticate the user device on a basis of a second authentication protocol, different to the first authentication protocol, and selectively allow the user device to communicate with the service in dependence on said authentication; and
        said credential of the first type is for use by the intermediary system in obtaining a credential of a second type on behalf of the user device from the server, said request for the credential of the first type comprising data indicative of the user identity and being based on the second authentication protocol;
    responsive to receiving, by the intermediary system, the credential of the first type from the server, transmitting, by the intermediary system and to the server, a request for the credential of the second type on behalf of the user device via said second communications link, said credential of the second type being for use by the user device in establishing authenticated communication with the service via a third communications link between the user device and the service, said request for the credential of the second type comprising data indicative of the user identity and being based on the second authentication protocol; and
    in response to receiving the credential of the second type, transmitting the credential of the second type to the user device via the first communications link.

2. The method of claim 1, in which the user device comprises a plurality of applications, the method comprising:
    maintaining a record comprising data indicative of each application that has been authorized to communicate with the service by the intermediary system; and
    selectively transmitting said request for the credential of the second type via the second communications link in dependence on said record.

3. The method of claim 1, in which the credential of the second type is encrypted on the basis of a key corresponding to the intermediary system, and the method comprises decrypting the credential of the second type on the basis of said key and thereafter transmitting the decrypted credential of the second type via the first communications link.

4. The method of claim 1, the method comprising transmitting a portion of said credential of the second type via the first communications link, said portion being for use by the user device in establishing authenticated communication with the service via the third communications link, wherein said portion comprises one or more of:
    a service ticket;
    a session key;
    a network address;
    the user identity; and
    a validity time period associated with the credential of the second type.

5. The method of claim 1, the method comprising selectively transmitting said request for the credential of the first type or said request for the credential of the second type on the basis of a predetermined criterion, wherein the predetermined criterion comprises one or more of the following:
    a geographical location of the user device;
    a network address associated with the user device;
    an authorization state associated with the user device;
    one or more applications on the user device;
    usage history;
    an authorization state associated with the user identity; and
    an operational state associated with the user device.

6. The method of claim 1, wherein:
    the credential of the first type is associated with a predetermined validity period and the method comprising:
        monitoring for expiry of the predetermined validity period associated with the credential of the first type;
        in response to said expiry, causing issuance of a further credential of the first type to enable the intermediary system to obtain a further credential of the second type on behalf of the user device;
        causing issuance of the further credential of the first type in response to receiving a request for the further credential of the second type via the first communications link; or
    the credential of the second type is associated with a further predetermined validity period and the method comprising:
        monitoring for expiry of the further predetermined validity period associated with the credential of the second type; and
        in response to expiry of the further predetermined validity period, causing issuance of a further credential of the second type in response to receiving a request thereof via the first communication link, thereby enabling the user device to maintain authenticated communication with the service via the third communications link.

7. The method of claim 1, the method comprising transmitting said request for the credential of the first type in response to receiving a request for the credential of the second type via the first communications link or transmitting said request for the credential of the second type in response to receiving therefor via the first communications link.

8. A method of facilitating authenticated communication between a user device and a service associated with a network via an intermediary system comprising an intermediary apparatus, the method comprising causing the user device to:
transmit an authentication request of a first type comprising data indicative of a user identity via a first communications link between the user device and the intermediary system, the authentication request of the first type being based on a first authentication protocol for use in enabling authenticated communication with the user device; thereafter to
transmit a request for a credential of a second type via the first communications link, said credential of the second type being for use in enabling authenticated communication with the service via a second authentication protocol, different to said first authentication protocol, wherein the intermediary system is configured to obtain said credential of the second type on a basis of a credential of a first type, said credential of the first type, obtained by the intermediary system from a sever associated with the network, being for use by the intermediary system in obtaining said credential of the second type on behalf of the user device from the server associated with the network; and
in response to receiving, by the intermediary system, the credential of the second type, transmit the credential of the second type via a further communications link, different from said first communication link and configured between the user device and the service, whereby to establish authenticated communication with the service.

9. The method of claim 8, in which the user device comprises a plurality of applications and the credential of the second type is for use by at least one said application when authorized to access said service, the method comprising:
maintaining a record comprising data indicative of each application that is authorized to communicate with the service via the further communications link;
selectively transmitting said request for the credential of the second type via the first communications link in dependence on said record;
causing said application to be authorized for access to said service by the intermediary system; and thereafter
updating said record to include data indicative of the application.

10. The method of claim 8, the method comprising transmitting said request for the credential of the second type in response to receiving an authentication challenge via the further communications link.

11. The method of claim 8, further comprising authorizing the user device to generate said request for the credential of the second type by a process whereby the user is authenticated by the user device.

12. The method of claim 8, wherein said credential of the second type is associated with a predetermined validity time period, the method comprising transmitting a further request for a further credential of the second type in response to expiry of said predetermined validity time period.

13. The method of claim 8, the method comprising receiving a portion of the credential of the second type via the first communications link, and transmitting an authentication request comprising data indicative of said portion via the further communications link, thereby establishing authenticated communication between the intermediary system and the service, wherein said portion comprises one or more of:
a service ticket;
a session key;
a network address;
the user identity; and
a validity time period associated with the credential of the second type.

14. The method of claim 8, the method comprising causing the user device to select said intermediary apparatus from a plurality of intermediary apparatuses based on data identifying the service, on data identifying a domain associated with the service, or on data identifying said one intermediary apparatus received from a further intermediary apparatus different from said one intermediary apparatus.

15. An intermediary system for facilitating authenticated communication between a user device and a service associated with a network, the intermediary system comprising at least one intermediary apparatus comprising a processor and at least one memory, wherein the processor and the at least one memory are arranged to cause the apparatus to at least:
responsive to receiving an authentication request comprising data indicative of a user identity via a first communications link between the user device and the intermediary system, selectively configure the intermediary system to where the user device is authorized to communicate with the intermediary system, wherein the authentication request is based on a first authentication protocol; thereafter:
transmit a request for a credential of a first type via a second communications link between the intermediary system and a server, wherein:
the server is associated with the network and is arranged to authenticate the user device on a basis of a second authentication protocol, different to the first authentication protocol, and selectively allow the user device to communicate with the service in dependence on said authentication;
said credential of the first type is for use by the intermediary system in obtaining a credential of a second type on behalf of the user device from the server, said request for the credential of the first type comprising data indicative of the user identity and being based on the second authentication protocol;
responsive to receiving, by the intermediary system, the credential of the first type from the server, transmit to the server a request for the credential of the second type on behalf of the user device via said second communications link, said credential of the second type being for use by the user device in establishing authenticated communication with the service via a third communications link between the user device and the service, said request for the credential of the second type comprising data indicative of the user identity and being based on the second authentication protocol; and
in response to receiving the credential of the second type, transmit the credential of the second type via the first communications link.

16. The system of claim 15, in which the user device comprises a plurality of applications, wherein the processor and the at least one memory are arranged to cause the apparatus to at least:
maintain a record comprising data indicative of each application that has been authorized to communicate with the service by the intermediary system; and selectively transmit said request for the credential of the second type via the second communications link in dependence on said record.

17. The system of claim 15, in which the credential of the second type is encrypted on the basis of a key corresponding to the intermediary system, and wherein the processor and the at least one memory are arranged to cause the apparatus to at least decrypt the credential of the second type on the basis of said key and thereafter transmit the decrypted credential of the second type via the first communications link.

18. The system of claim 15, wherein the processor and the at least one memory are arranged to cause the apparatus to at least transmit a portion of said credential of the second type via the first communications link, said portion being for use by the user device in establishing authenticated communication with the service via the third communications link, wherein said portion comprises one or more of:
 a service ticket;
 a session key;
 a network address;
 the user identity; and
 a validity time period associated with the credential of the second type.

19. The system of claim 15, wherein the processor and the at least one memory are arranged to cause the apparatus to selectively transmit said request for the credential of the first type or said request for the credential of the second type on the basis of a predetermined criterion, wherein the predetermined criterion comprises one or more of the following:
 a geographical location of the user device;
 a network address associated with the user device;
 an authorization state associated with the user device;
 one or more applications on the user device;
 usage history;
 an authorization state associated with the user identity; and
 an operational state associated with the user device.

20. The system of claim 15, wherein:
the credential of the first type is associated with a predetermined validity period and wherein the processor and the at least one memory are arranged to cause the apparatus to:
 monitor for expiry of the predetermined validity period associated with the credential of the first type;
 in response to said expiry, cause issuance of a further credential of the first type to enable the intermediary system to obtain a further credential of the second type on behalf of the user device; and
 cause issuance of the further credential of the first type in response to receiving a request for the further credential of the second type via the first communications link; or
the credential of the second type is associated with a further predetermined validity period and the processor and the at least one memory are arranged to cause the apparatus to:
 monitor for expiry of the further predetermined validity period associated with the credential of the second type; and
 in response to expiry of the further predetermined validity period, cause issuance of a further credential of the second type in response to receiving a request thereof via the first communication link, thereby enabling the user device to maintain authenticated communication with the service via the third communications link.

* * * * *